United States Patent
Rassatt

(10) Patent No.: US 6,803,542 B2
(45) Date of Patent: Oct. 12, 2004

(54) FLOATING CARRIAGE ASSEMBLY AND COVER IN A THERMOGRAPHIC LASER IMAGER

(75) Inventor: Bradley B. Rassatt, Apple Valley, MN (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/377,337

(22) Filed: Feb. 28, 2003

(65) Prior Publication Data

US 2004/0169029 A1 Sep. 2, 2004

(51) Int. Cl.[7] .......................... G03C 5/16; G03G 15/20; G03D 13/00
(52) U.S. Cl. ...................... 219/216; 219/469; 430/350; 399/285
(58) Field of Search ............................... 219/216, 388, 219/469; 430/350, 353; 399/279, 285, 286; 355/27, 405

(56) References Cited

U.S. PATENT DOCUMENTS 4,335,951 A * 6/1982 Scribner ..................... 399/339
6,007,971 A * 12/1999 Star et al. ................... 430/350
6,288,370 B1 * 9/2001 Ogawa et al. .............. 219/469
6,297,476 B1 * 10/2001 Kashino et al. ............. 219/216
6,400,446 B1 * 6/2002 Kashino et al. ............. 355/405

FOREIGN PATENT DOCUMENTS

JP          J009152790    *  6/1997

* cited by examiner

Primary Examiner—Joseph Pelham
(74) Attorney, Agent, or Firm—William F. Noval

(57) ABSTRACT

A thermal processor for heat processing exposed thermographic media comprising: a heated drum for heating thermographic media brought into contact with the drum; a centrally located assembly for supporting the drum for rotation; a plurality of spaced rollers located around a segment of the drum for holding media into contact with the drum; and a plate assembly for mounting the plurality of rollers for movement between a first position in contact with the drum and a second position out of contact with the drum, the plate assembly having first and second spaced alignment plates having circular features that align with the bearing assembly when the plate assembly is in the first position, whereby the rollers are aligned with the drum.

11 Claims, 5 Drawing Sheets

US 6,803,542 B2

FLOATING CARRIAGE ASSEMBLY AND COVER IN A THERMOGRAPHIC LASER IMAGER

FIELD OF THE INVENTION

This invention relates in general to laser imaging systems and more particularly to thermographic laser imagers having improved image quality.

BACKGROUND OF THE INVENTION

Thermally processed media are widely used in a variety of applications, such as in medical, industrial and graphic imaging fields. For example, medical laser imagers reproduce diagnostic images on thermally processed photothermographic film. After the thermal film is exposed it, it developed by means of a heated member, such as a rotatable heated drum. Subsequently, the film (media) is cooled and output to a user.

U.S. Pat. No. 6,007,971, issued Dec. 28, 1999, inventors Star et al., discloses a commercially successful apparatus, system and method for processing photothermographic elements. After exposure to a diagnostic/medical image, the exposed photothermographic film is thermally developed by bringing the film into contact with a rotating heated drum having a resilient layer, with a plurality of rollers holding the film to the drum.

The rollers are mounted in brackets which can be lifted away from the heated drum to allow easier access to the drum for cleaning, and for clearing any jams that may occur of film being transported through the thermal processor.

During thermal development the exposed film is sensitive to roller pressure variation. Any roller skew out of roundness may cause an image artifact of cross web banding. This cross web banding is typically due to pressure variation as the film is transported through the pressure roller and drum. This image artifact may repeat itself down web and its frequency typically corresponds to the roller circumference. The non-uniform pressure between the pressure rollers and drum also increases optical density variations of the film. The entrance and exit of the film is a key parameter with respect to image artifacts due to non-uniform pressure. Velocity variation as the film exits or enters the drum may result in lifting the rollers or increase contact with the heated drum. These pressure and contact changes also result in an increased optical density variation of the film. There is thus a need for a thermal processor with improved image quality.

SUMMARY OF THE INVENTION

According to the present invention, there is provided a solution to these problems.

According to a feature of the present invention, there is provided a thermal processor for heat processing exposed thermographic media comprising: a heated drum for heating thermographic media brought into contact with the said drum; a centrally located assembly for supporting said drum for rotation; a plurality of spaced rollers located around a segment of said drum for holding media into contact with said drum; and a plate assembly for mounting said plurality of rollers for movement between a first position in contact with said drum and a second position out of contact with said drum, said plate assembly having first and second spaced alignment plates having circular features that align with a bearing assembly when said plate assembly is in said first position, whereby said rollers are aligned with said drum.

ADVANTAGEOUS EFFECT OF THE INVENTION

The invention has the following advantages.

1. Self aligning pressure roller assembly that accounts for process and manufacturing variability.
2. Removable cover for serviceability and system cleaning.
3. Improved optical density performance due to uniform pressure between rollers and drum.

DETAILED DESCRIPTION OF THE INVENTION

Figure 1:
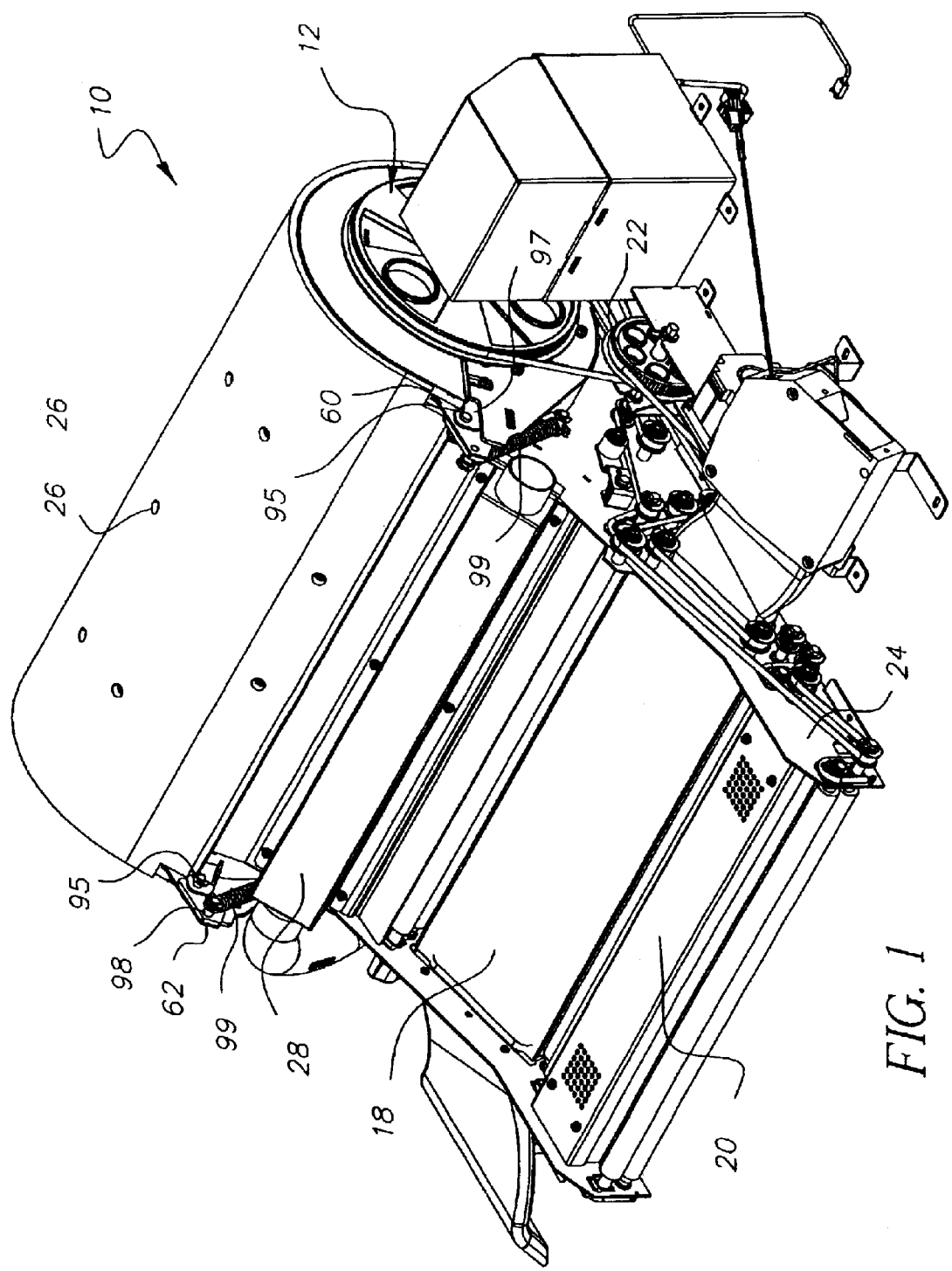
FIG. 1 is a perspective view of a laser imager thermal processor incorporating the present invention.
Figure 2:
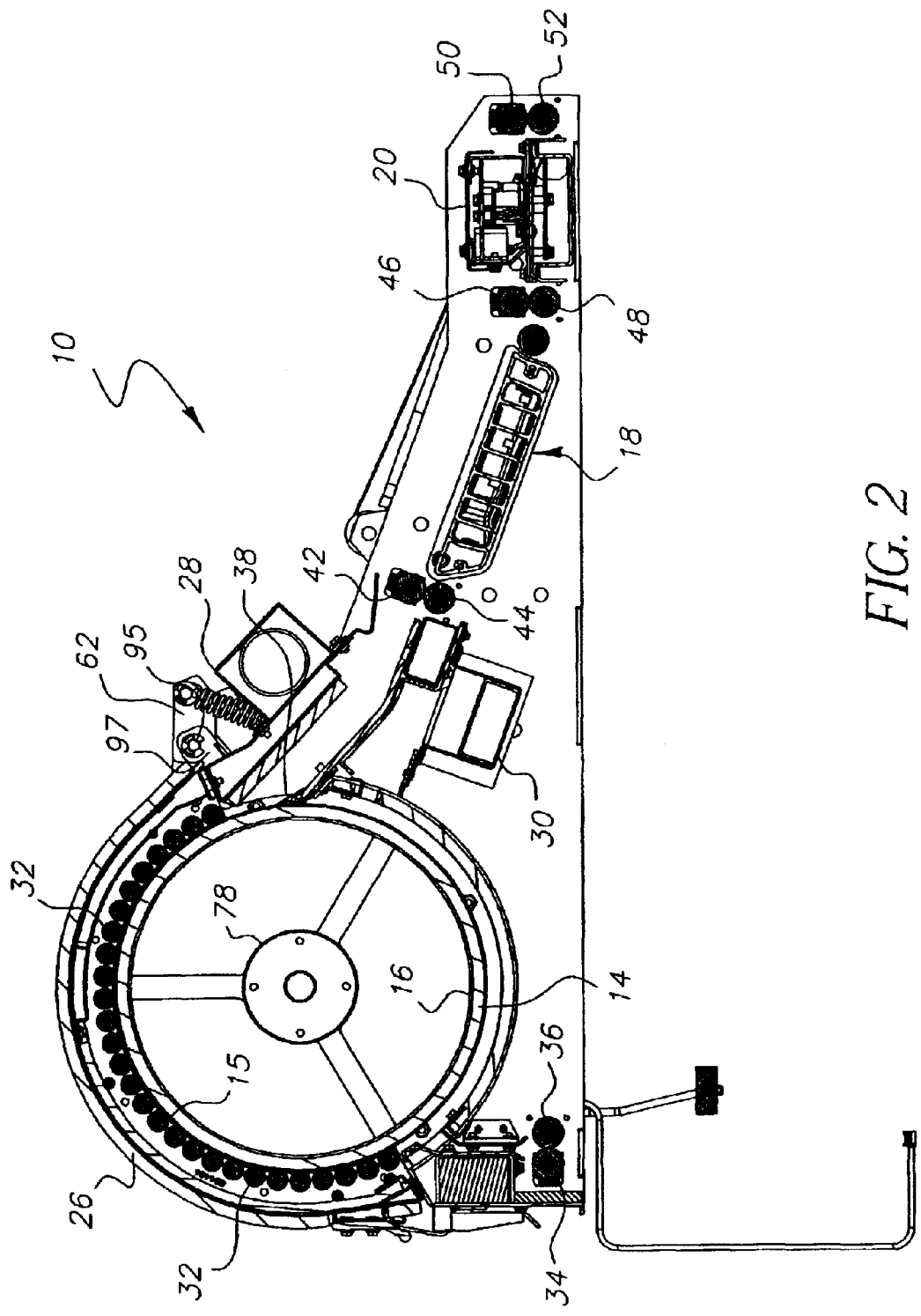
FIG. 2 is a side elevational view of the thermal processor of FIG. 1.

Referring now to FIGS. 1 and 2 there is shown an exemplary thermal processor of a laser imager incorporating an embodiment of the present invention. As shown, thermal processor 10 includes a main drum assembly 12 having a rotatably mounted heated drum 14 having an outer resilient layer 15. Drum 14 is heated with a blanket electrical heater 16 applied to the inner surface of drum 14. The electrical heater is divided into a plurality of electrical heater zones across the width of the drum, to minimize optical density variations in the cross media direction. Processor 10 also includes a cooling section 18 for cooling the heated media, densitometer 20 for measuring the density of a media density patch, drive train 22, chassis member 24, cover assembly 26 and condensation traps 28, 30. Rollers 32 hold an exposed film in contact with drum 14.

In operation, exposed film is fed by roller pair 34, 36 into contact with drum 14, rollers 32 holding film in contact with heated drum 14. Drive train 22 rotates drum 14 at a desired rotational velocity. Drum rotational velocity, drum diameter, and film wrap on drum 14 determine drum dwell time. Thermal processor 10 is configured to process up to 160 images per hour for 35×43 cm. film.

Film is stripped from drum 14 by stripper 38 which directs the heated film along an exit path over cooling section 18. Roller pairs 42, 44, 46, 48 and 50, 52 transport the film along the exit path to an output tray past densitometer 20.

Figure 3:
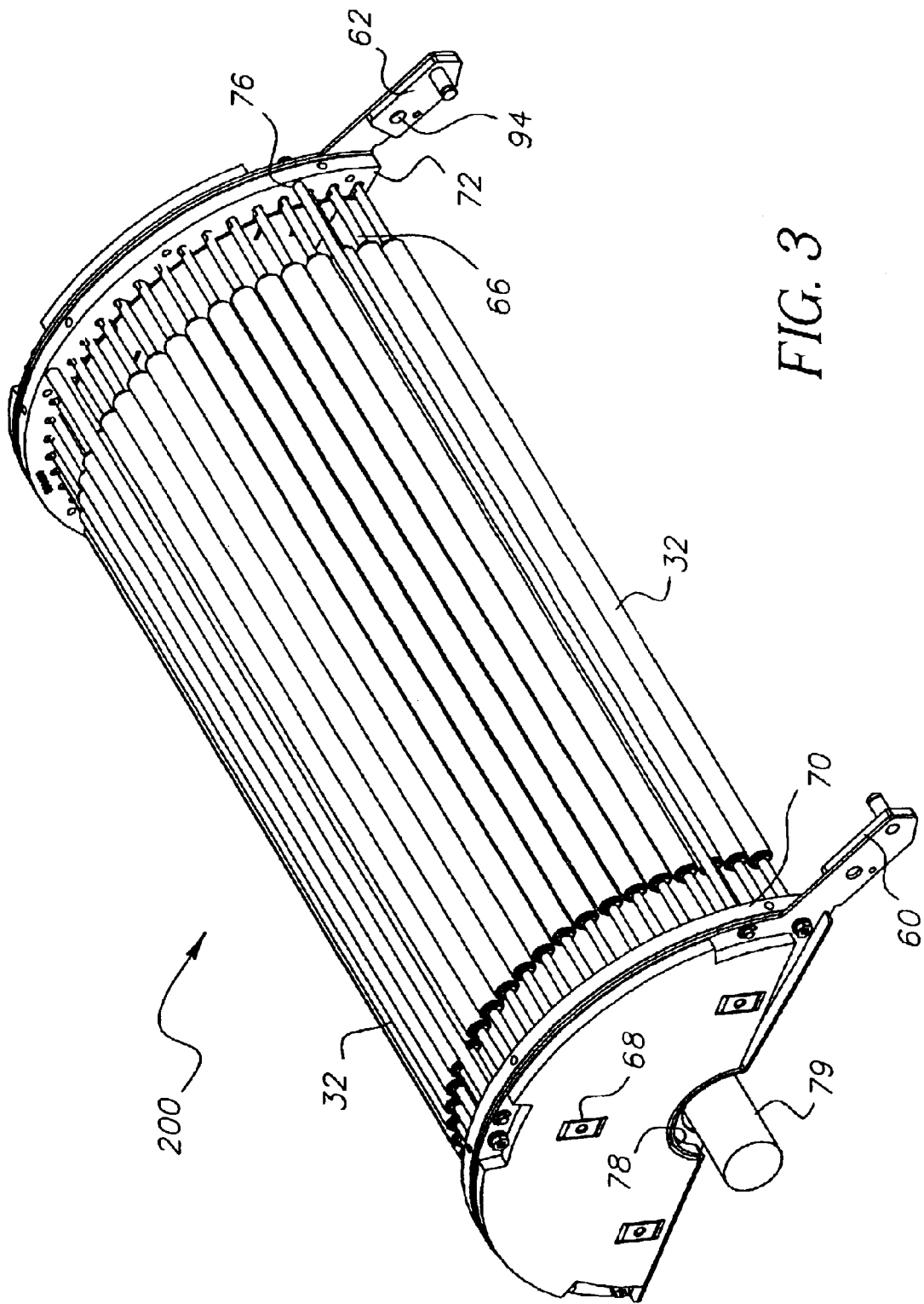
FIG. 3 is a perspective view of a pressure roller assembly according to the invention.
Figure 4:
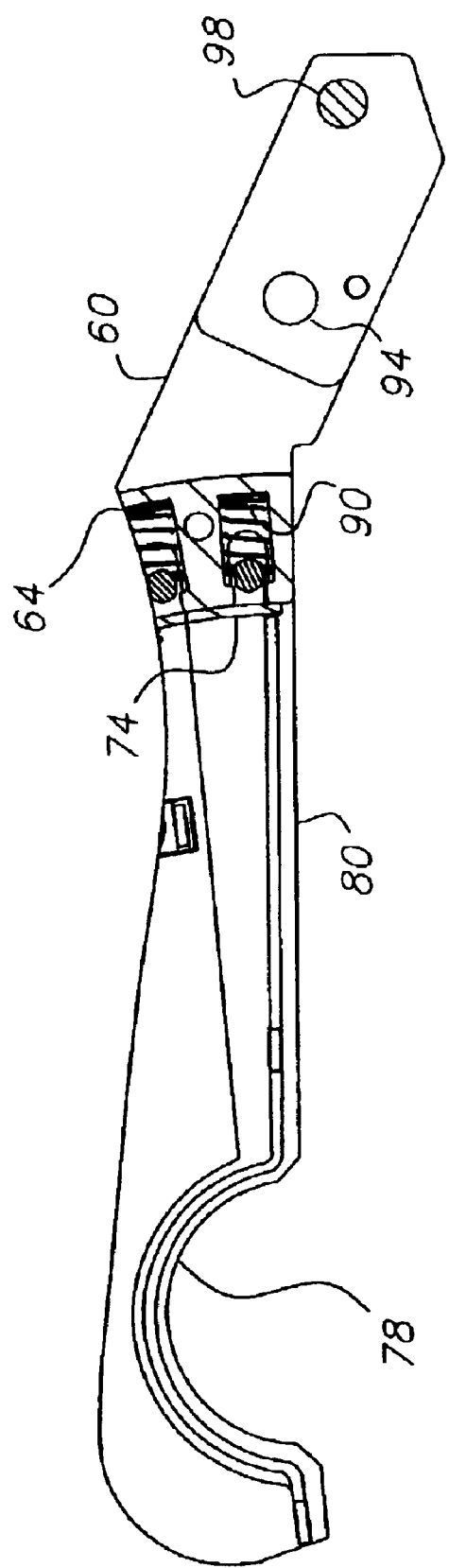
FIG. 4 is an elevational view of a component of the assembly of FIG. 3.
Figure 5:
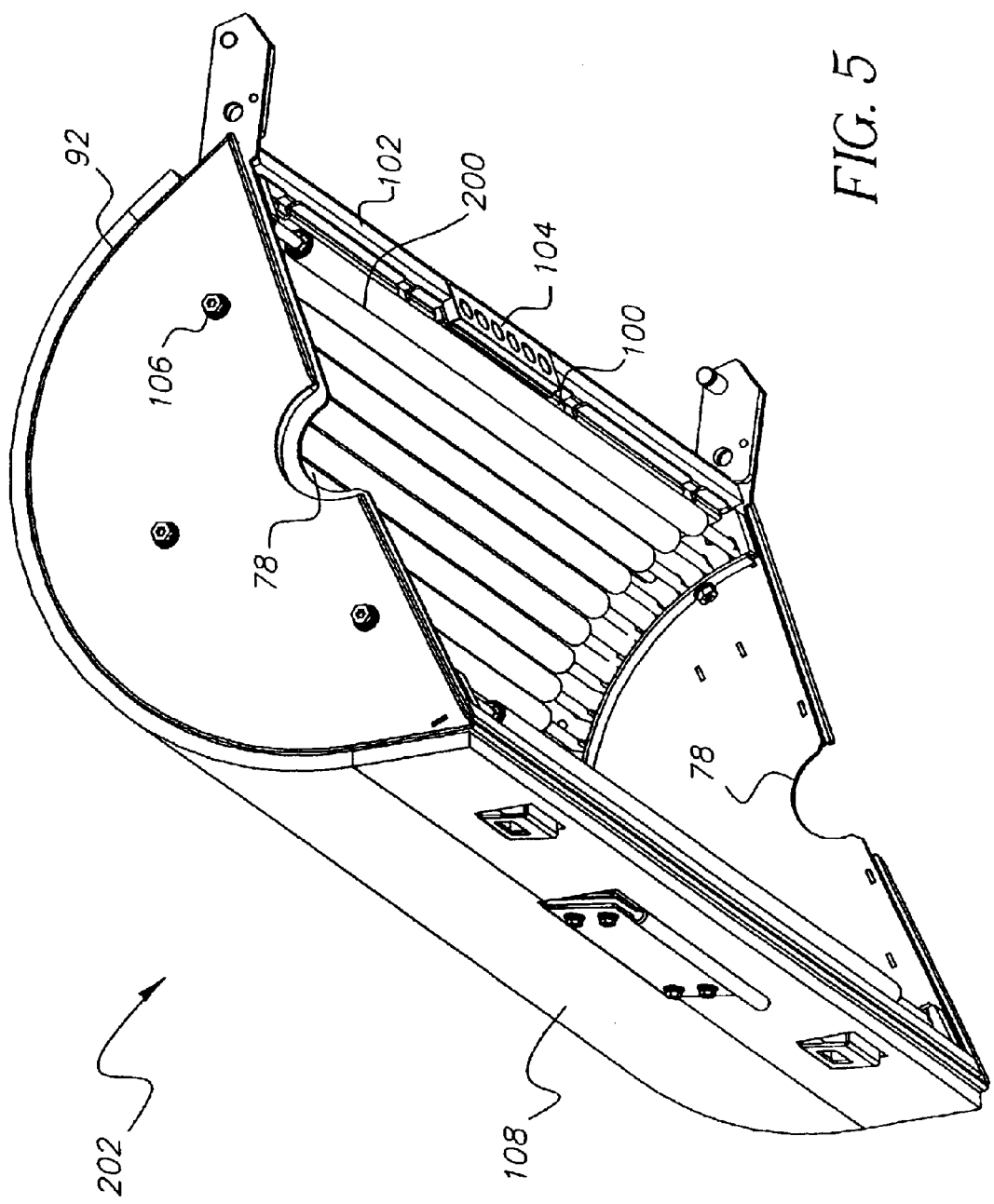
FIG. 5 is a perspective view of the assembly cover of the thermal processor of FIG. 1.

Referring now to FIGS. 3–5 there is shown an embodiment of the present invention. The Pressure Roller Assembly 200 includes pressure rollers 32, front alignment plate 60, back alignment plate 62, compression springs 64, retaining rods 66, insulation 68, front retaining plate 70, back retaining plate 72 and keepers 74. The pressure roller assembly is designed to self-align to the drum shafts and to maintain a constant radial force. The pressure rollers 32 are allowed to float in the radial direction and are held in the retaining plate 70, 72 with a keeper 74. The front and back retaining plates 70, 72 are attached to the front and back alignment plates 60, 62 through retaining rods 66 and e-clips. The retaining plates 70, 72 have clearance holes 76 in which the retaining rods 66 float. The alignment plates 60, 62 have a circular feature 78 that aligns to shaft bearings 79. The primary alignment for the pressure roller assembly is through the shaft bearings 79 and the secondary alignment through the flat surface 80 bearing on the chassis member 24 (FIG. 1). Alignment plates 60, 62 have pivot holes 94 which receive pivots 95 on brackets 97. Plates 60, 62 have pins 98 for springs 99 attached to chassis member 24. When cover assembly 26 is moved away from drum 14, plates 60, 62 pivot on pivots 95. Springs 99 counter balance the weight of cover assembly 26.

The primary function of the pressure roller assembly is to provide uniform pressure on the film and drum. One of the most significant variables in optical density variations is pressure roller alignment to the main drum. Misalignment of the pressure rollers and drum results in non-uniform contact in the axial and radial direction.

The pressure of the roller 32 to the film which is equivalent to the weight of the roller. The net pressure of each roller 32 varies with the angular position to the drum center. The drum surface normal-force varies due to the roller orientation. A constant force is maintained from roller to roller through compression springs 64. The retaining plate 70, 72 has pockets 90 with different depths to compensate for roller weight changes. The retaining plates 70, 72 hold the springs 64 and are contained with the alignment plate within fasteners.

The pressure roller assembly 200 also provides the mechanism for opening the cover 92 and is a carrier for the cover 92. The pressure roller assembly 200 rotates through the pivot clearance hole 94 and stops on the chassis 24. The cover 92 and pressure roller assembly 200 opens towards the center of the machine, this provides for ease of drum 14 removal to the side and front of the imager.

The cover assembly 202 is presented in FIG. 5. The assembly primarily consists of the pressure roller assembly 200, insulation 100, gasket 102, internal duct 104, floating fastener arrangement 106, cover 92, and label/heat shield 108.

The design function of the cover 92 is to provide for a sealed or closed container, a device to retain heat, and an internal duct routing for containment removal. The cover 92 is a floating assembly that is mounted to the pressure roller assembly 200. The cover 92 utilizes a latch and extension springs for sealing and aligning the pressure roller assembly 200 to the drum bearings 79. The latching capabilities ensure adequate seating of the roller assembly 200 to the drum bearings 79. This provides for precise roller 32 alignment to the drum 14 and prevents spinning of the bearings. The cover 92 may be removed from the pressure roller assembly 200 during servicing.

The invention has been described in detail with particular reference to certain preferred embodiments thereof, but it will be understood that variations and modifications can be effected within the spirit and scope of the invention.

PARTS LIST 10 thermal processor
12 main drum assembly
14 drum
16 blanket electrical heater
18 cooling system
20 densitometer
22 drive train
24 chassis member
26 cover assembly
28 condensation trap
30 condensation trap
32 pressure rollers
34 roller pair
36 roller pair
38 stripper
42 roller pairs
44 roller pairs
46 roller pairs
48 roller pairs
50 roller pairs
52 roller pairs
60 front alignment plate
62 back alignment plate
64 compression springs
66 retaining rods
68 insulation
70 front retaining plate
72 back retaining plate
74 keeper
76 clearance holes
78 circular feature
79 shaft bearings
80 flat surface
90 pockets
92 cover
94 pivot clearance hole
95 pivot
97 brackets
98 pins
99 springs
100 insulation
102 gasket
104 internal duct
106 floating fastener arrangement
108 label/heat shield
200 pressure roller assembly
202 cover assembly

What is claimed is:

1. A thermal processor for heat processing exposed thermographic media comprising:

a heated drum for heating thermographic media brought into contact with the said drum;

a centrally located assembly for supporting said drum for rotation;

a plurality of spaced rollers located around a segment of said drum for holding media into contact with said drum; and a plate assembly for mounting said plurality of rollers, said plate assembly adapted for pivotable movement to move said plurality of rollers between a first position in contact with said drum and a second position out of contact with said drum, said plate assembly having first and second spaced alignment plates having circular features that align with a bearing assembly when said plate assembly is in said first position, whereby said rollers are aligned with said drum.

2. The thermal processor of claim 1 wherein said plurality of rollers are mounted by said plate assembly so that they are allowed to float in the radial direction relative to said drum and maintain a constant radial force.

3. A thermal process for heat processing exposed thermographic media comprising:

a heated drum for heating thermographic media brought into contact with the said drum;

a centrally located assembly for supporting said drum for rotation;

a plurality of spaced rollers located around a segment of said drum for holding media into contact with said drum;

a plate assembly for mounting said plurality of rollers for movement between a first position in contact with said drum and a second position out of contact with said drum, said plate assembly having first and second spaced alignment plates having circular features that align with a bearing assembly when said plate assembly is in said first position, whereby said rollers are aligned with said drum and are mounted by said plate assembly so that they are allowed to float in the radial direction relative to said drum and maintain a constant radial force; and first and second retaining plates, roller mounting means for mounting said plurality of rollers by said first and second retaining plates, and retaining plate mounting means for mounting said first and second said retaining plates by said first and second alignment plates in such a way as to allow said retaining plates to move radially relative to said alignment plates.

4. The thermal processor of claim 3 wherein said roller mounting means allow said rollers to float in a radial direction relative to said drum and to maintain a constant force.

5. The thermal processor of claim 3 wherein said retaining plate mounting means includes a plurality of retaining rods extending between said first and second retaining plates, said first and second retaining plates having clearance holes in which said rods float.

6. The thermal processor of claim 3 including a cover assembly covering said plurality of rollers and being mounted by said plate assembly for removal from said roller assembly.

7. The thermal processor of claim 6 wherein said cover has thermal insulation to retain heat when said roller assembly is in said first position in contact with said heated drum.

8. The thermal processor of claim 1 including a cover assembly covering said plurality of rollers and being mounted by said plate assembly.

9. The thermal processor of claim 8 wherein said cover assembly comprises thermal insulation to retain heat when said plurality of rollers is in said first position in contact with said heated drum.

10. The thermal processor of claim 1 wherein said plurality of rollers provides a substantially uniform pressure on thermographic media and said drum when said plurality of rollers is in said first position.

11. The thermal processor of claim 1 wherein said plate assembly further comprises mounting means to allow said plurality of rollers to float in a radial direction relative to said drum and to maintain a constant force.

* * * * *